United States Patent [19]

Littell

[11] Patent Number: 5,013,075
[45] Date of Patent: May 7, 1991

[54] VACUUM CUP CONSTRUCTION

[76] Inventor: Edmund R. Littell, 81 High St., Winnetka, Ill. 60093

[21] Appl. No.: 368,416

[22] Filed: Jun. 19, 1989

Related U.S. Application Data

[63] Continuation-in-part of Ser. No. 142,135, Jan. 11, 1988, Pat. No. 4,852,926.

[51] Int. Cl.$^5$ ............................ B25J 15/06; B66C 1/02
[52] U.S. Cl. ...................................... 294/64.1; 248/363
[58] Field of Search ...................... 294/64.1, 65; 248/205.5, 206.2, 362, 363; 269/21; 271/90, 103; 279/3; 414/121, 627, 737, 744 B, 752; 901/40

[56] References Cited

U.S. PATENT DOCUMENTS

| | | | |
|---|---|---|---|
| 1,252,280 | 1/1918 | McDonald | 248/363 X |
| 1,302,028 | 4/1919 | Fuchs et al. | 294/64.1 |
| 2,382,405 | 8/1945 | Eckman | 294/64.1 |
| 2,637,589 | 5/1953 | Schulz et al. | 294/64.1 |
| 2,725,255 | 11/1955 | Watter | 294/64.1 |
| 2,871,054 | 1/1959 | Zinke | 294/64.1 |
| 2,876,026 | 3/1959 | Mancini | 294/64.1 X |
| 3,152,828 | 10/1964 | Lytle | 294/64.1 |
| 3,351,370 | 11/1967 | Olson | 294/64.1 |
| 3,377,096 | 4/1968 | Wood | 294/64.1 |
| 3,640,562 | 2/1972 | Creskoff | 294/64.1 X |
| 3,863,969 | 2/1975 | Weiss et al. | 294/64.1 |
| 3,910,620 | 10/1975 | Sperry | 294/64.1 |
| 4,006,929 | 2/1977 | Barker | 294/64.1 |
| 4,023,845 | 5/1977 | Schnebly | 294/64.1 |
| 4,852,926 | 8/1989 | Littell | 294/64.1 |

FOREIGN PATENT DOCUMENTS

| | | | |
|---|---|---|---|
| 1324980 | 7/1987 | U.S.S.R. | 294/64.1 |
| 972612 | 10/1964 | United Kingdom | 294/64.1 |

*Primary Examiner*—Johnny D. Cherry
*Attorney, Agent, or Firm*—Allegretti & Witcoff, Ltd.

[57] ABSTRACT

A vacuum cup construction designed to support large items includes a planar outer plate, and a planar, generally coincidentally shaped inner plate which is smaller than the outer plate. A generally flat coincidentally shaped compressible unmolded, non-preferred sealing member, which is larger than the inner plate, is retained between the outer and inner plates by a threaded stud and an associated nut. The tightening of nut on the threaded stud compresses the sealing member between the outer and inner plates. Compression of the sealing member causes the periphery to deform and form a sealing edge. A vacuum passage passes through the outer plate, the sealing member, and the inner plate to permit a vacuum to be drawn when the assembly is placed against the surface of an item or object.

30 Claims, 4 Drawing Sheets

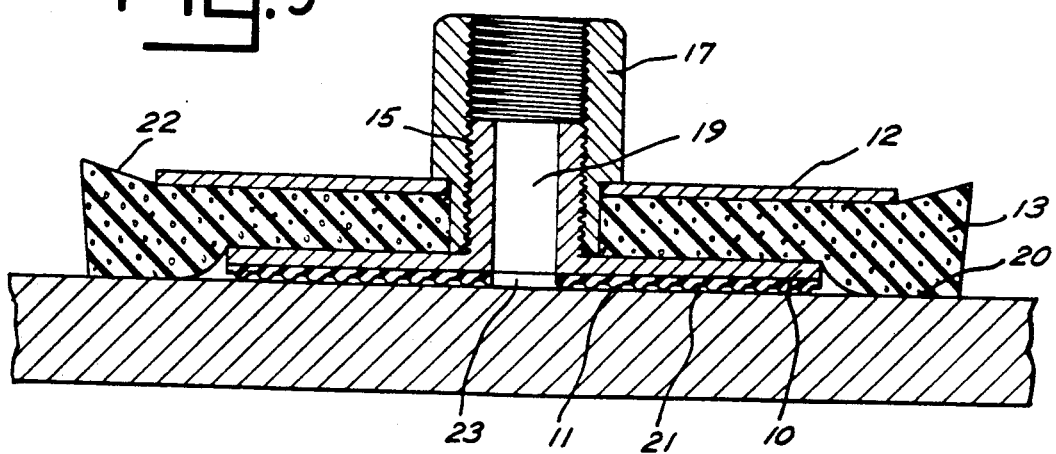
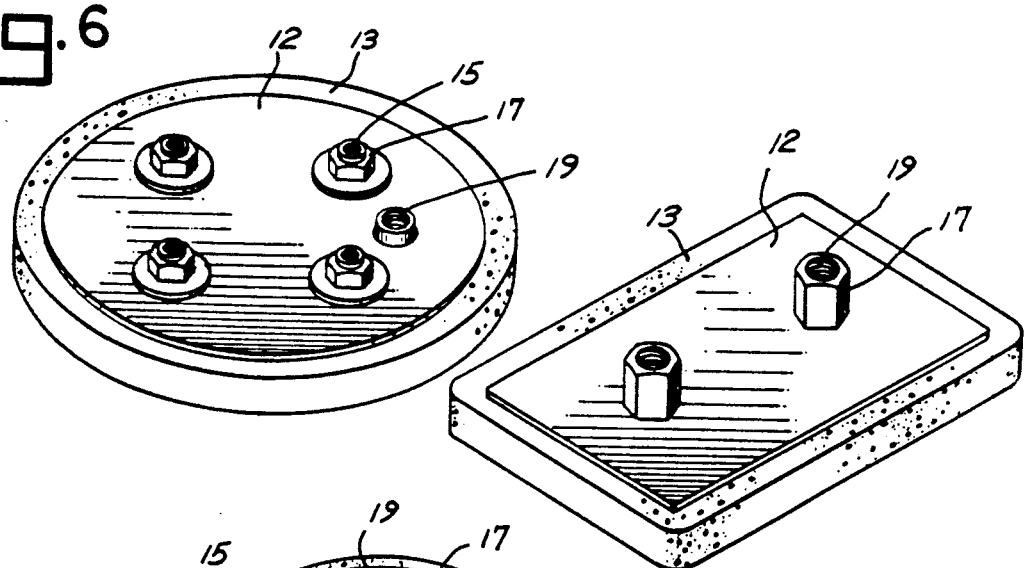
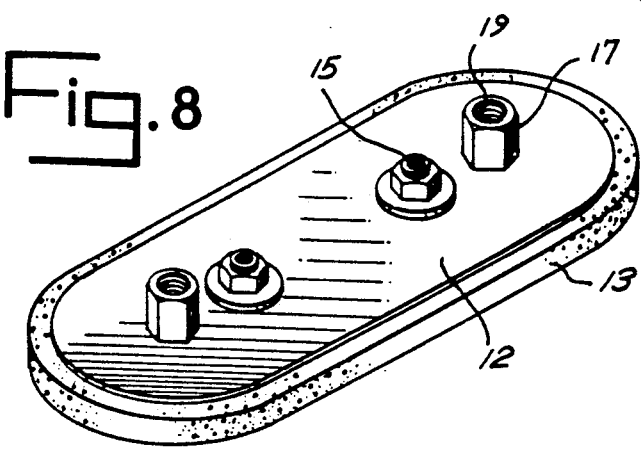

VACUUM CUP CONSTRUCTION

This is a continuation in part application of U.S. patent application Ser. No. 142,135 filed Jan. 11, 1988, now U.S. Pat. No. 4,852,926.

BACKGROUND OF THE INVENTION

1. Field of the invention

The field of the invention comprises devices generally known as vacuum support cups.

2. Description of the Prior Art

Heretofore various constructions have been proposed for vacuum cups of the type which are attached to an object for lifting of that object. vacuum cups are used, for example for attachment to plate glass from a supporting or lifting device. A known prior art vacuum cup construction comprises a solid rubber cup with a central vacuum port which permits to be drawn within the cup. Another embodiment comprises a solid rubber cup laminated to a mental backing. A third embodiment employs two metal plates which clamp upon a preformed solid rubber sealing ring to form a cup upon which a vacuum may be drawn. A fourth embodiment comprises a stucture similar to the third embodiment that has been modified by laminating a soft rubber ring to the edge of the solid rubber cup. Yet another embodiment in the prior art comprises a single metal with a soft rubber ring laminated to the base of the metal plate for purposes of supplying a vacuum seal. In all instances, a cup is formed with a flexible edge to engage an object and a vacuum port is connected to the inside of the cup whereby the cup may be evacuated to effect attachment of the cup to an object. There has remained, however, the need for an improved vacuum cup construction.

SUMMARY OF THE INVENTION

Briefly the present invention comprises an improved vacuum cup construction which includes an outer plate and an inner plate wherein the inner plate is smaller than the outer plate. The construction also includes a compressible sealing member between the outer and inner plates wherein the sealing member is larger than the inner plate, means for connecting the outer plate to the inner plate to compress and form the sealing member and thereby define a sealing edge, and at least one tube passing through the sealing member, the outer plate and the inner plate adapted for connection to a vacuum source.

This device has at least three major advantages over the prior art. First the sealing member may be quickly replaced by a new member when the sealing edge is no longer able to sustain a vacuum. This allows for significant savings in the time and cost to replace a cup associated with prior art constructions when it is worn and no longer able to sustain a vacuum. A second major advantage is that the sealing member is reusable. In the preferred embodiment the opposite flat side of the sealing member may be used to create a second sealing edge by simply reversing the sealing member and replacing it between the outer and inner plates. Thus, the sealing member has twice the life, resulting in a significant savings in the cost of vacuum cups. A third major advantage is that the sealing member requires no molding or preforming. By contrast, in the prior art vacuum cups, the sealing member has a molded, preformed cup shape. In the present invention the cup shape is caused by differential compression of the sealing member between the inner and outer plates. Thus, no preforming of the sealing member is necessary. This results in a significant savings in the cost of manufacturing the sealing member.

Thus, it is an object of the invention to provide an improved vacuum cup construction. Yet a further object of the invention is to provide an improved vacuum cup construction comprised of a plurality of parts including a pair of generally planar opposed parallel plates which are generally coincidentally shaped and have a flexible, elastomeric sealing member retained between the plates.

Yet another object of the invention is to provide an improved vacuum cup construction comprised of generally coincidentally shaped planar plates wherein one of the plates has a generally smaller size than the other plate and further wherein a flexible elastomeric sealing member is retained by compression between the plates.

Yet a further object of the invention is to provide a sealing cup construction having a simplified construction which may be easily repaired.

Yet a further object of the invention is to provide an improved vacuum cup which may be assembled utilizing a variety of materials.

Yet a further object of the invention is to provide a vacuum cup construction wherein the sealing characteristics associated with the vacuum cup may be altered by substitution of the particular elastomeric sealing material utilized in the sealing member of the vacuum cup construction.

Still another object of the invention is to provide an efficient, economical vacuum cup construction.

These and other objects, advantages and features of the invention will be set fourth in detailed description as follows:

BRIEF DESCRIPTION OF THE DRAWING

In the detailed description which follows, reference will be made to the drawing comprised of the following figures:

FIG. 4 is a perspective view of the elastomeric sealing member associated with the vacuum cup of the invention wherein FIGS. 2, 3 and 4 are juxtaposed with respect to one another to depict an exploded view of the construction of FIG. 1;

FIG. 6 is a perspective view of an alternative configuration of a vacuum cup construction incorporating the principals of the invention;

FIG. 7 is a perspective view of yet a further embodiment incorporating the principals of the invention;

FIG. 8 is a perspective view of a further embodiment incorporating the construction principals of the invention; and FIG. 9 is a cross-sectional view of the vacuum cup as it is attached to the surface of an object by means of a vacuum.

DETAILED DESCRIPTION OF THE PREFERRED EMBODIMENT

Figure 1:
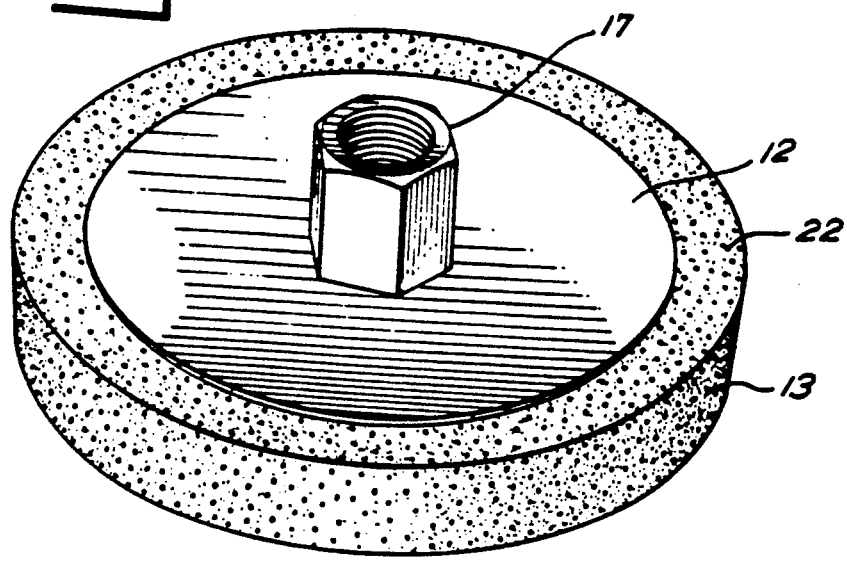
FIG. 1 is a perspective view of the assembled vacuum cup of the invention.

FIG. 1 is a perspective view of a preferred embodiment of the invention. The three major elements of the cup include (1) an inner plate 10, (2) an outer plate 12 and (3) an intermediate sealing member 13. The combination is designed so both the outer plate 12 and the sealing member 13 have an effective area larger than that of the inner plate 10. The sealing member 13 is placed on the inner plate 10 so that a passage 14 is associated with a threaded stud 15 projecting from the plate 10. The outer plate 12 is attached to this assembly via a passage 16 which fits over the threaded stud 15. The combination is secured by means of a threaded nut 17. The tightening of said threaded nut 17 onto the threaded stud 15 secures the combination and causes compression of sealing member 13 between plates 10 and 12. This compression forces that part of the sealing member 13 that extends over the edge of the inner plate 10 down around the edge of the inner plate 10. This creates the cup formation with a depth 18. The cup is placed on the surface of an object and a vacuum is drawn through a vacuum port or passage 19. The vacuum causes the cup to attach itself to the object along a peripheral sealing edge 20.

Figure 2:
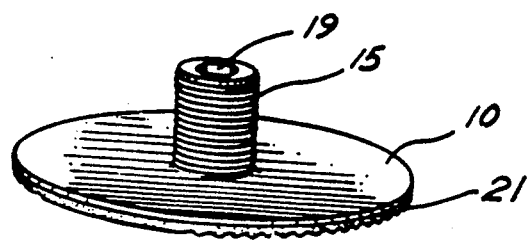
FIG. 2 is a perspective view of the inner plate associated with the vacuum cup of the invention.

FIG. 2 is a depiction of the inner plate 10. The inner plate 10 is generally planar; however, it not restricted to a simple flat plane. It may take the shape of many complex planes such as a cylindrical plane or a spherical plane. The inner plate 10 is constructed of a rigid material, generally aluminum or steel but the material may vary with the application. In the preferred embodiment the inner surface 11 of the inner plate 10 is laminated with a rubber coating 21 to protect the surface of the object. Attached to the inner plate 10 are means for securing it to the outer plate 12. Any appropriate means can be used. The preferred embodiment has a threaded stud 15 welded to the outer side of the inner plate 10. The inner plate 10 further includes a passage 23 to allow a vacuum source to connect to the inside of the cup construction.

This vacuum passage 19 passes through the inner plate 10, the sealing member 13, and the outer plate 12. At the outer plate 12 a fitting may be provided to allow attachment of the vacuum source. In one embodiment, the vacuum passage 19 is simply a tube welded over the passage 23 on the inner plate 10 that is threaded so as to accept a vacuum source. A threaded nut 17 may be used for securing the outer plate 12 to the inner plate 10. A vacuum source may then be attached to the end of tube 19.

Figure 3:
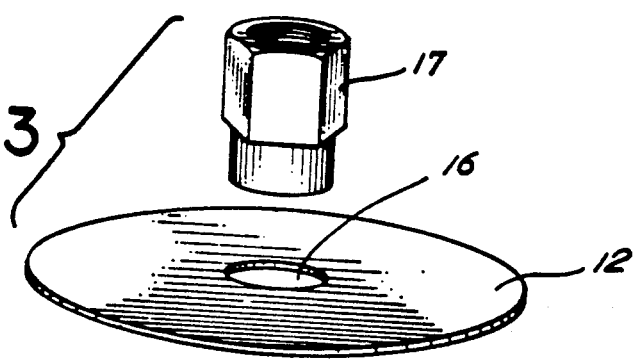
FIG. 3 is a perspective view of the outer plate associated with the vacuum cup of the invention.

FIG. 3 depicts the outer plate 12. The outer plate 12 like the inner plate 10 is generally planar and made out of a rigid material. Steel or aluminum are generally used, however, this may vary with the application. The effective area of the outer plate 12 is preferably larger than the effective area of the inner plate 10. The effective area of both plates is that surface area that interacts with the surface of the sealing member 13. This size differential is necessary in order to properly compress the sealing member 13 and create a cup shape with depth 18.

The relative size of the outer plate 12 with respect to the sealing member 13 is not critical factor. The outer plate 12 may be larger than the sealing member 13. However, in the preferred embodiment the effective area of the outer plate 12 is smaller than the sealing member 13. This relationship minimizes the material needed for the outer plate 12 and provides the sealing member 13 clearance to absorb compression when a vacuum is drawn on the cup.

The outer plate 12 is equipped with a passage 16 to allow the threaded stud 15 to pass through. The threaded nut 17 may then be threaded on the threaded stud 15.

Figure 4:
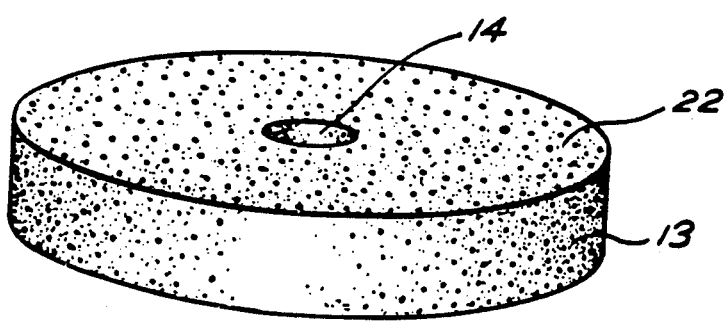

FIG. 4 depicts the sealing member 13. The sealing member 13 is constructed of a compressible, elastomeric soft material. Generally the material used is a closed cell foam rubber, such as neoprene. Other alternatives would include: an open cell foam rubber, laminated, on at least the sealing side, with a solid rubber surface; or an inflatable solid rubber sealing member, the size of said sealing member being adjustable by the increase or decrease of internal air pressure. The choice of the compressibility and hardness of the sealing member 13 is empirical, dependent on the desired use of the vacuum cup construction. In any case, the material must be able to sustain a vacuum. Therefore, it must be impermeable to air. In the preferred embodiment the sealing member 13 is supplied with an opposing side 22, also impermeable to air. This allows the sealing member to be reused simply by flipping it and reinserting it between the inner plate 10 and outer plate 12.

The sealing member 13 requires no premolding or preforming. In the preferred embodiment the sealing member is flat prior to being compressed. It is not necessary, however, that the sealing member be flat in order for the combination to be operative. The sealing member 13 will be just as effective if it were performed to allow for a deeper cup. However, preforming the sealing member would likely effect its ability to be reused on the opposing side 22.

Figure 5:
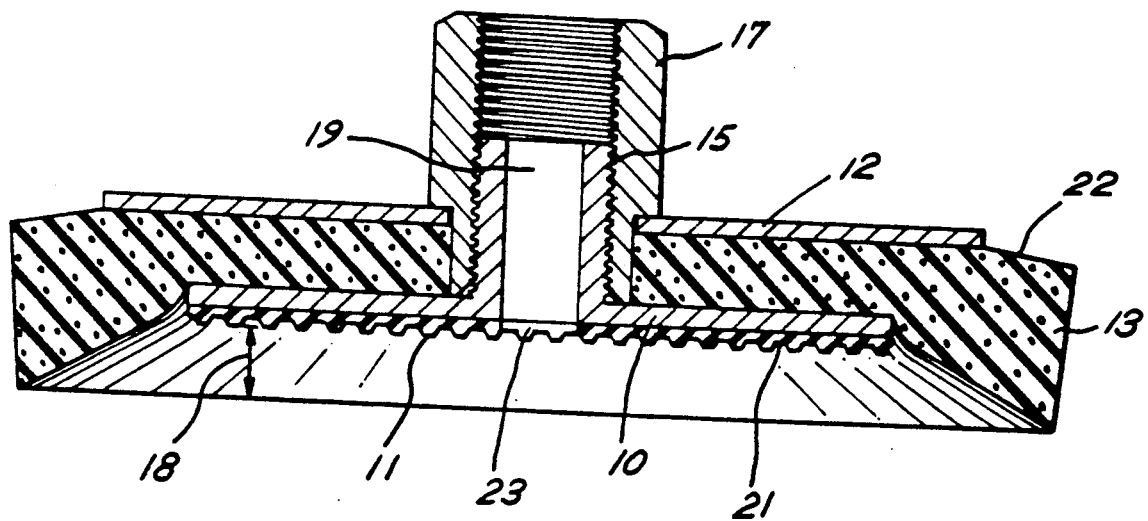
FIG. 5 is a side cross-sectional view of the construction of FIG. 1.

The compression of the sealing member 13 is demonstrated in FIG. 5. When compressing the sealing member 13 two factors are of importance: first, the sealing member 13 must be compressed enough to allow for formation of the cup with depth 18; second, the integrity of the seal must be maintained. For example, when the sealing member 13 consists of closed cell foam rubber, the compression cannot be so great as to rupture the cells and destroy its ability to hold a vacuum. Generally, when the sealing member 13 is compressed to about 50%-70% of its original thickness both goals can be achieved. A standard cup uses a sealing member 13 about 1 inch thick. However, this dimension may be varied for specific applications.

In most applications the sealing member 13 would have a shape generally coincident with that of the inner plate 10, thereby extending equally over all sides of the inner plate 10. However, this is not necessary. In some applications it is desirable to have the extension of the sealing member 13 non equidistant around the edge of the inner plate 10. In such a case the shape of the sealing members and the inner plate 10 may be significantly different. Such an embodiment is particularly helpful when the surface of the object being attached is not flat, such as the curved surface of a cylinder.

The amount of the extension of the sealing member 13 over the inner plate 10 combined with the shape of the object to which the cup is being attached will determine the width of the sealing edge 20. This sealing edge 20 would encompass a portion of the sealing member 13 about the periphery of the inner plate 10. For example, if the extension is great and the cup is being attached to a flat surface the sealing edge 20 will be broad. In contrast, if the extension is just as great and the cup is being attached to a cylindrical surface the sealing edge 20 along the cylindrical surface would be much more narrow.

FIG. 9 illustrates the formation of the sealing edge 20. The extension of the sealing member 13 over the edge of the inner plate 10 interacts with the surface of the object to be attached. When a vacuum is drawn through the vacuum tube 19 the extension of the sealing member 13 is forced against the surface of the object creating the sealing edge 20.

FIGS. 6, 7 and 8 demonstrate that the cup may take many different shapes. The most common shapes employed are round, rectangular and oblong. However, if a particular application required a special shape the cup could be so tailored. Indeed, if it were required, the same cup may have a different shape sealing member 13, inner plate 10, and outer plate 12.

Depending on the shape of the cup and the need for uniform compression on the sealing member 13 there may be a plurality of threaded studs 15 and a plurality of vacuum passages 19 may be required. Generally, the larger the cup, the greater the need for additional threaded studs 15 and vacuum passages 19. In such a case the sealing member 13, the inner plate 10, and the outer plate 12 would be adapted to allow for passage of the additional studs and passages. Also, the studs and passages may be provided separately rather than integrated as depicted in the preferred embodiments.

Figure 10:
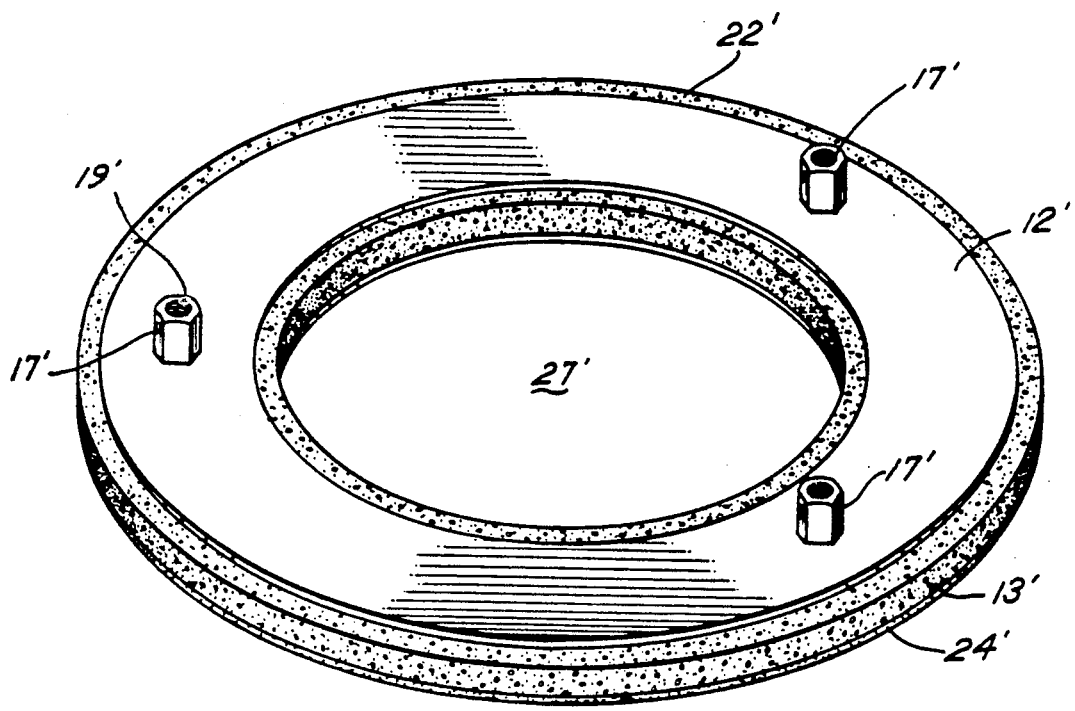
FIG. 10 is a perspective view of a further embodiment incorporating the principals of the invention.
Figure 11:
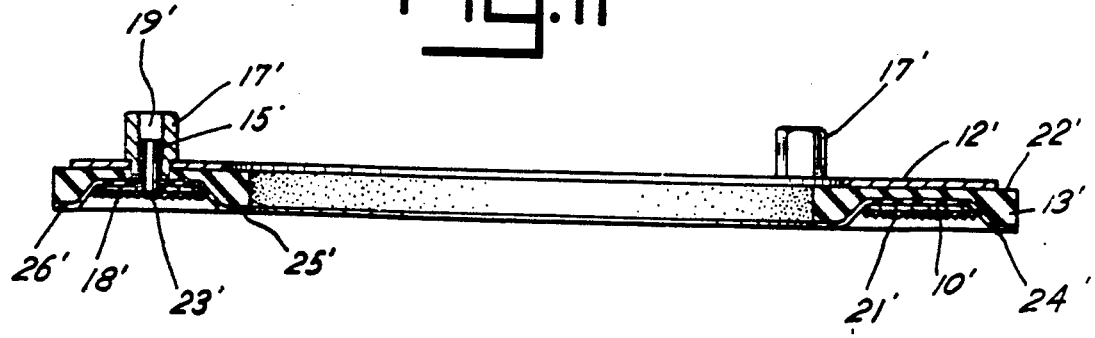
FIG. 11 is a cross-sectional view of the construction of FIG. 10.

An additional embodiment of the invention is shown in FIGS. 10 and 11. In this embodiment, in addition to a soft elastomeric sealing member 13' there is a solid elastomeric member 24' on the sealing side of the sealing member 13' between said sealing member 13' and an inner plate 10'. Preferably, the inner plate 10' has an elastomeric layer 21' laminated to its inner surface. The solid elastomeric member 24' is generally flat, substantially thinner than the sealing member 13' and preferably coincidental in shape with the sealing member 13'. Moreover, the effective area of the solid elastomeric member 24' is preferably about equal to the effective area of the sealing member 13'. The solid elastomeric member 24' is preferably constructed of a solid rubber material. The solid elastomeric member 24' is connected to the sealing member 13' only by the interaction between a threaded stud 15', the inner plate 10' and a outer plate 12'. Therefore, the sealing member 13' and the solid elastomeric member 24' are completely separate component parts and separately replaceable.

In this embodiment, like the prior embodiment, vacuum is drawn through a vacuum part 19' which passes through the threaded stud 15' which is welded about a passage 23' on the inner plate 10'. The vacuum cup maintains its ability to hold a vacuum longer, because the solid elastomeric member 24' will withstand greater wear than the soft compressible material of the sealing member 13'. Moreover, when the cup does lose the ability to hold a vacuum, generally, only the solid elastomeric member 24' will have to changed, thereby providing the significant advantages of extended cup life and reduced costs of replacement materials. The embodiment of FIG. 10 also maintains the advantage and desirability of not having to preform or premold the vacuum cup, because in a preferred embodiment both the sealing member 13' or the solid elastomeric member 24' are substantially flat. The soft elastomeric material of the sealing member 13' will be compressed upon tightening of a threaded nut 17' on the threaded stud 15' and will correspondingly cause the solid elastomeric member 24' to deform and create the vacuum cup configuration.

The present invention allows for an adjustable cup depth 18' permitting the cup construction to be customized to a particular application. The cup depth 18 may be varied with the compression forces caused by the interaction of the threaded nut 17' and the threaded stud 15'. The greater the compression forces, the greater the depth 18'. The depth 18' may also be controlled by varying the relative size of the effective area of the sealing member 13' with respect to the size of the effective area inner plate 10'. A larger effective area of the sealing member 13' will allow a greater cup depth, 18'. The cup depth, 18' may be an important feature, especially in applications where the vacuum cup is being attached to a irregular surface.

FIGS. 10 and 11 further illustrate how the present invention can be customized in another manner. Specifically, FIGS. 10 and 11 demonstrate that the vacuum cup can be constructed in an annular shape, thereby providing an opening 27' in the interior of the cup to accommodate irregularities on the surface of the object to be manipulated. In such a structure there are two sealing edges, an inner sealing edge 25' and an outer sealing edge 26'. An annular shaped cup can be constructed with or without the solid elastomeric layer 24'. Moreover, it is not necessary that the opening 27' be at the center of the cup. For example, a cup may be designed to pick up objects from a surface which contains an off center protrusion, a handle for example. Such a cup would have the opening 27' situated to accommodate the off center protrusion.

The above description is illustrative of the present invention and is not intended to limit the invention in spirit or scope. Only the following claims and their equivalents limit the scope of the invention.

What I claim is:

1. An improved vacuum cup construction comprising in combination:
   a. a first generally planar outer plate;
   b. a second, generally planar inner plate having an effective area which is less than that of the outer plate;
   c. a compressible generally planar sealing member between the outer and inner plates, the sealing member having an effective area greater than the inner plate area;
   d. a solid generally planar elastomeric member between the inner plate and the compressible sealing member, the solid elastomeric member having an effective area greater than the inner plate area;
   e. means for compressing the elastomeric member and the compressible sealing member between the outer plate and the inner plate and for deformation of the elastomeric member and the compressible sealing member therebetween, thereby forming a sealing edge about the periphery of the inner plate; and
   f. at least one vacuum passage extending from the inner side of the construction for connecting a vacuum source, whereby the construction may be positioned against a surface and a vacuum drawn to seal the sealing edge on the surface.

2. The vacuum cup of claim 1 wherein the sealing member is made of a soft, open cell rubber.

3. The vacuum cup of claim 1 wherein the solid elastomeric member is made of a solid rubber material.

4. The vacuum cup of claim 1 including an elastomeric layer laminated to the inner surface of the inner plate.

5. The vacuum cup of claim 1 wherein the shape of the solid elastomeric member is generally coincidental with the shape of the sealing member.

6. The vacuum cup of claim 1 wherein the shape of the sealing member is generally coincident with the shape of the inner plate.

7. The vacuum cup of claim 1 wherein the shape of the sealing member the solid elastomeric member, the outer plate and the inner plate are all generally coincidental.

8. The vacuum cup of claim 1 wherein the means for compressing is releasable.

9. The vacuum cup of claim 8 wherein the means for compressing is a threaded stud mounted on the inner plate and passing through the outer plate and secured with a threaded nut.

10. The vacuum cup of claim 9 wherein the vacuum passage passes through the core of said stud.

11. The vacuum cup of claim 1 further characterized by a cup depth, said cup depth being the distance on a plane perpendicular to the inner surface of the inner plate from the inner surface of the inner plate to the sealing edge.

12. The vacuum cup of claim 11 wherein the means for compressing can also adjust the cup depth.

13. The vacuum cup of claim 12 wherein the means for compressing is a threaded stud mounted on the inner plate and passing through the outer plate and secured with a threaded nut.

14. An improved vacuum cup construction comprising in combination:
   a. a first generally planar outer plate, said outer plate defining an inner edge and an outer edge;
   b. a second, generally planar inner plate having an effective area less than that of the outer plate, said inner plate defining an inner edge and an outer edge;
   c. a compressible sealing member between the outer and inner plates, the sealing member having an effective area greater than the inner plate area and extending beyond the inner and outer edges of the inner plate, the combination of the inner plate, the outer plate, and the sealing member defining an opening in the interior of the construction;
   d. means for compressing the sealing member between the outer plate and the inner plate;
   e. an outer sealing edge about the outer edge of the inner plate;
   f. an inner sealing edge about the inner edge of the inner plate; and
   g. at least one vacuum passage extending from the inner side of the construction for connecting a vacuum source, whereby the construction may be positioned against a surface and a vacuum drawn to seal the sealing edges on the surface.

15. The vacuum cup of claim 14 wherein the sealing member is made of a soft, closed cell rubber.

16. The vacuum cup of claim 14 including an elastomeric layer laminated to the inner surface of the inner plate.

17. The vacuum cup of claim 14 wherein the shape of the sealing member, is generally coincident with the shape of the inner plate.

18. The vacuum cup of claim 14 further comprising a solid elastomeric member between the inner plate and the sealing member, the elastomeric member having an effective area greater than the inner plate and extending beyond the inner and outer edges of the inner plate.

19. The vacuum cup of claim 18 wherein the solid elastomeric member is made of a solid rubber material.

20. The vacuum cup of claim 18 wherein the shape of the solid elastomeric member is generally coincidental with the shape of the sealing member.

21. The vacuum cup of claim 18 wherein the shape of the sealing member, the solid elastomeric member, the outer plate and the inner plate are all generally coincidental.

22. The vacuum cup of claim 18 wherein the sealing member is made of a soft, open cell rubber.

23. The vacuum cup of claim 14 wherein the means for compressing is releasable.

24. The vacuum cup of claim 23 wherein the means for compressing is a threaded stud mounted on the inner plate and passing through the outer plate and secured with a threaded nut.

25. The vacuum cup of claim 24 wherein the vacuum passages passes through the core of said stud.

26. The vacuum cup of claim 14 further characterized by a cup depth, said cup depth being the distance on a plane perpendicular to the inner surface of the inner plate from the inner surface of the inner plate to the outer sealing edge.

27. The vacuum cup of claim 26 further comprising a means for adjusting the cup depth.

28. The vacuum cup of claim 27 wherein the means for compressing adjusts the cup depth.

29. The vacuum cup of claim 28 wherein the means for compressing is a threaded stud mounted on the inner plate and passing through the outer plate and secured with a threaded nut.

30. The vacuum cup of claim 14 wherein the means for compressing is a threaded stud mounted on the inner plate and passing through the outer plate and secured with a threaded nut.

* * * * *